Feb. 15, 1938.   M. R. McNALLY   2,108,291
TRACTOR WHEEL SCRAPER
Filed May 20, 1936
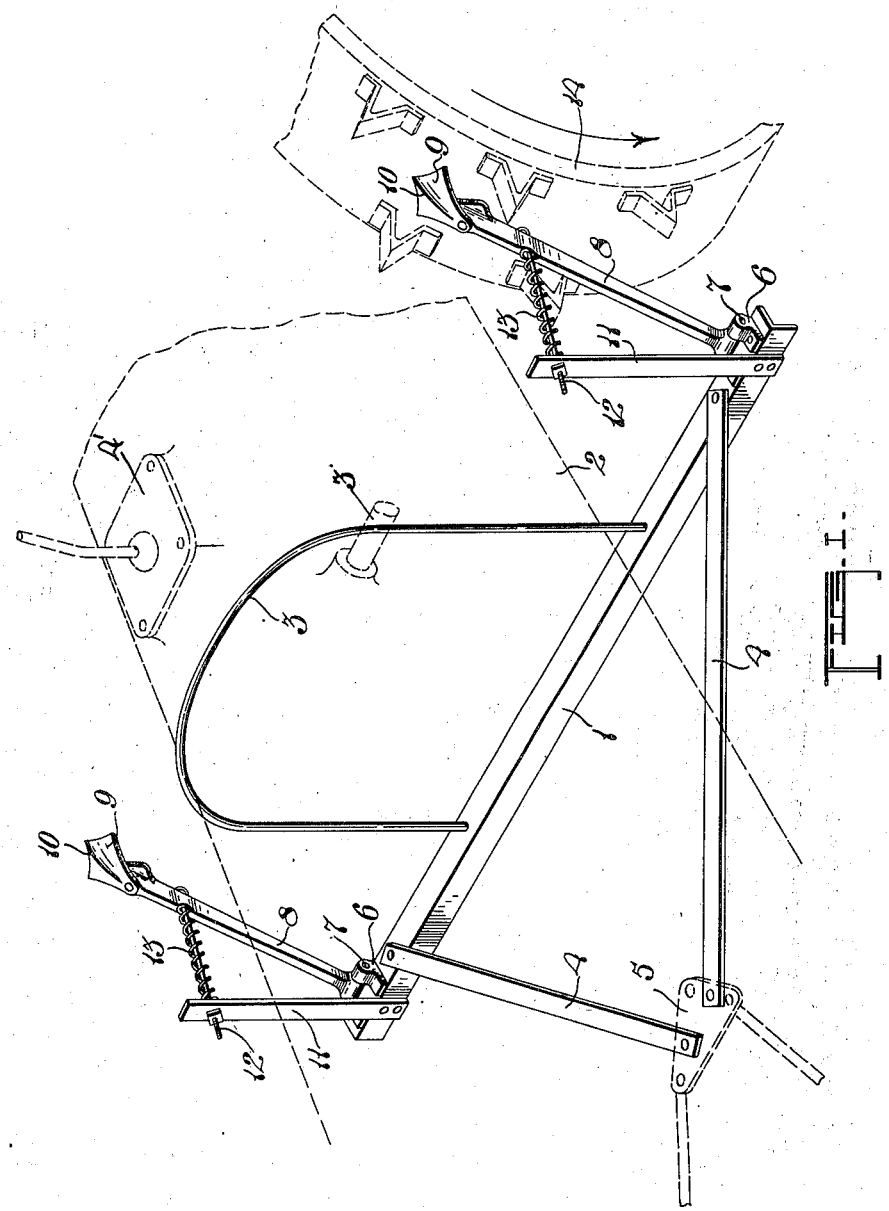
INVENTOR
M. R. McNALLY
BY Fetherstonhaugh & Co.
ATTYS.

Patented Feb. 15, 1938

2,108,291

UNITED STATES PATENT OFFICE 2,108,291

TRACTOR WHEEL SCRAPER

Malcolm Roy McNally, Lumsden, Saskatchewan, Canada, assignor of one-half to W. Beattie Ramsay, Lumsden, Saskatchewan, Canada Application May 20, 1936, Serial No. 80,884

1 Claim. (Cl. 280—158)

This invention relates to improvements in tractor wheel scrapers and an object of the invention is to provide a device of the character herein described which will effectively remove deposits from between the cleats of the conventional type of tractor wheel.

A further object of my invention is to provide a device of the character herein described which is designed to be mounted in front of the tractor wheels so that in the event of a hard piece of substance jamming in the cleats, damage to the scraper will not endanger the operator of the tractor.

A further object of my invention is to provide a device of the character herein described which may be used with various different types of tractors.

A still further object of my invention is to provide a device of the character herein described which is rugged in construction and will not easily become out of order.

With the above more important objects in view and such other minor objects as may appear as the specification proceeds, my invention consists essentially in the arrangement and construction of parts all as hereinafter more particularly described, reference being had to the accompanying drawing, in which:—

The figure illustrates a perspective view of my improved type of tractor wheel scraper in situ upon a tractor.

This invention consists of a transversely extending angle iron 1 which passes beneath the engine casing 2 of a tractor, ahead of the driving wheels, and is held in position by means of a curved yoke 3, passing over the engine casing between the pulley shaft 3' and the pulley gear box 4' which is attached to the angle iron at either end thereof.

Bracing members 4 extend between the angle iron and the radius rod plate 5 to prevent any horizontal turning or twisting of the iron.

Mounted upon either end of the angle iron are a pair of spaced brackets 6 having bearings therein to receive a pin 7. Upwardly and rearwardly extending arms 8 are pivotally mounted upon the pins and carry at their outer extremities scraping blades 9. The blades illustrated upon the accompanying drawing are provided with a central rib 10 and have a pointed configuration, but, of course, it is obvious that blades of various shapes may be used without departing from the spirit of the invention.

Attached upon the vertical flange of the angle iron 1 immediately in front of each of the arms 8, is an upstanding strap 11 having a threaded rod 12 passing therethrough, which also extends through an orifice within the arm 8. A helical spring 13 is interposed upon the rod between the arm and the strap and performs the function of keeping the scraper blade 9 in intimate contact with the surface of the tractor wheel 14 at all times, and also prevents damage to the scraper when the tractor is operated in a backward direction.

When the tractor is moving forward, however, the driving wheels rotate in the direction indicated, and the scraper blades which pass through the channel between the cleats, prevent the formation of deposits on the wheel peripheries.

From the foregoing, it will now be obvious that I have provided an extremely simple yet efficient type of tractor wheel scraper which is designed to remove all deposits from between the cleats of a tractor wheel and thus allow the tractor to operate the more efficiently.

Since various modifications can be made in the above invention, and many apparently widely different embodiments of same, made within the scope of the claim without departing from the spirit and scope thereof, it is intended that all matter contained in the accompanying specification shall be interpreted as illustrative only and not in a limiting sense and I desire only such limitations placed thereon as are specifically expressed in the accompanying claim.

What I claim as my invention is:

Improvements in tractor wheel scrapers comprising a transversely positioned angle bar secured to the under side of a tractor forward of the traction wheels thereof, a vertical cantilevered flat bar secured at the lower end thereof at a point adjacent the end of said angle bar, a bearing secured to said angle bar in transverse alignment with respect to said flat bar and an arm pivotally secured to said bearing and extending upwardly therefrom at an angle with respect to said flat bar, said arm terminating in a scraping blade of a curved configuration and comprising a central upstanding rib and a pair of scraping faces curving away upon either side of said rib so that when bearing against the periphery of a traction wheel the whole scraping edge will be in contact therewith with the end of said rib in advanced position, a screw threaded rod secured at one end at a point upon said arm, the said rod passing through an aperture adjacent the upper end of said flat bar, a coiled compression spring extending over said rod between said arm and said flat bar, the end of said rod which passes through said flat bar being secured against withdrawal, said spring being designed to maintain said blade in continual engagement with the periphery of said traction wheel.

MALCOLM ROY McNALLY.